(12) United States Patent
Fitzke et al.

(10) Patent No.: US 7,698,842 B2
(45) Date of Patent: Apr. 20, 2010

(54) SIGN, ESPECIALLY A NUMBER PLATE FOR A MOTOR VEHICLE

(75) Inventors: Michael Fitzke, Lehre (DE); Michael Mueller, Gifhorn (DE)

(73) Assignees: Volkswagen AG, Wolfsburg (DE); Fitzke Werberechnik, Gifhorn (DE)

( * ) Notice: Subject to any disclaimer, the term of this patent is extended or adjusted under 35 U.S.C. 154(b) by 670 days.

(21) Appl. No.: 10/503,434

(22) PCT Filed: Jan. 17, 2003

(86) PCT No.: PCT/EP03/00424

§ 371 (c)(1),
(2), (4) Date: Feb. 3, 2005

(87) PCT Pub. No.: WO03/064210

PCT Pub. Date: Aug. 7, 2003

(65) Prior Publication Data

US 2005/0120605 A1    Jun. 9, 2005

(30) Foreign Application Priority Data

Jan. 31, 2002 (DE) .................. 202 01 377 U
Mar. 6, 2002 (DE) .................. 102 09 691
Oct. 12, 2002 (DE) .................. 102 47 708

(51) Int. Cl.
*G09F 13/22* (2006.01)
(52) U.S. Cl. .................................. 40/544
(58) Field of Classification Search ............ 40/544
See application file for complete search history.

(56) References Cited

U.S. PATENT DOCUMENTS

| | | | |
|---|---|---|---|
| 3,274,419 A * | 9/1966 | Roth | 313/503 |
| 3,758,191 A | 9/1973 | Hedgewick | |
| 4,020,389 A | 4/1977 | Dickson et al. | |
| 4,603,065 A * | 7/1986 | Mori et al. | 428/31 |
| 5,339,550 A * | 8/1994 | Hoffman | 40/544 |
| 5,552,679 A | 9/1996 | Murasko | |
| 6,242,056 B1 * | 6/2001 | Spencer et al. | 427/512 |
| 6,411,029 B1 | 6/2002 | Czak | |
| 6,926,972 B2 * | 8/2005 | Jakobi et al. | 428/690 |

FOREIGN PATENT DOCUMENTS

| | | |
|---|---|---|
| DE | 297 12 954 | 10/1997 |
| DE | 197 17 740 | 11/1998 |
| DE | 198 27 477 | 2/1999 |

(Continued)

*Primary Examiner*—Lesley D Morris
*Assistant Examiner*—Shin Kim
(74) *Attorney, Agent, or Firm*—Kenyon & Kenyon LLP

(57) ABSTRACT

A plate, e.g., a license plate for motor vehicles, includes a base body which is made of an electrically conductive material, or has an electrically conductive layer applied either directly or via a further layer. Thus, the electrically conductive base body or its electrically conductive coating forms a first electrode of a flat capacitor. A layer having an electroluminescent pigmentation is applied on the base body or the electrically conductive layer. The electroluminescent coating may be applied by various methods, e.g., spray painting, brushing, special screen-printing methods, etc. To create the electrical field, it may be necessary to apply to the electroluminescent layer an electrically conductive layer for forming the second electrode.

18 Claims, 1 Drawing Sheet

FOREIGN PATENT DOCUMENTS

| | | |
|---|---|---|
| DE | 299 11 348 | 11/1999 |
| DE | 101 12 328 | 9/2001 |
| DE | 200 22 563 U | 11/2001 |
| JP | 47-041200 | 12/1972 |
| JP | 58-182901 | 10/1983 |
| JP | 11-59288 | 3/1999 |
| JP | 11-175015 | 7/1999 |
| JP | 2000-229544 | 8/2000 |
| JP | 2000-284703 | 10/2000 |
| JP | 2001-185362 | 7/2001 |
| WO | WO 95/08818 | 3/1995 |
| WO | WO 98/20375 | 5/1998 |
| WO | WO 99/27396 | 6/1999 |
| WO | WO 01/36559 | 5/2001 |
| WO | WO 01/84583 | 11/2001 |

* cited by examiner

SIGN, ESPECIALLY A NUMBER PLATE FOR A MOTOR VEHICLE

FIELD OF THE INVENTION

The present invention relates to a plate, particularly a license plate for motor vehicles, having an electroluminescent construction.

BACKGROUND INFORMATION

Conventional license plates for motor vehicles are produced from a sheet-metal blank that is provided with a reflective coating and is embossed to permit individual creation of the suitable letter and/or number combinations. After being embossed, the sheet-metal blanks are subjected to a hot-roll dying process for dying the embossed letter and/or number combinations. If desired, a transparent protective layer is applied on the finished plates.

A disadvantage is that, for good recognition of the letter and number combinations in the dark, a light source which illuminates the plate must be situated in the immediate vicinity of the license plate on the vehicle, so that the incident light beams can be reflected.

German Published Patent Application No. 198 27 477 describes a license plate for a motor vehicle, which, as active illumination, provides an electrically activatable reflecting film arrangement, situated at least in the region of the marking, which backs the marking and/or the plate surface. The license plate described in German Published Patent Application No. 200 22 563 includes the electroluminescent film arrangement. However, such an electroluminescent film arrangement does not allow the embossing of symbols, particularly letter and/or number combinations.

It is an aspect of the present invention to provide a plate, e.g., a license plate for motor vehicles, that has an electroluminescent construction and that is deformable and able to be embossed.

SUMMARY

The foregoing may be achieved by providing a plate as described herein. Further aspects are set forth herein.

According to an example embodiment of the present invention, the base body is made of an electrically conductive material, e.g. aluminum, or has an electrically conductive layer applied directly or indirectly via a further layer. The electrically conductive base body or its electrically conductive coating thus forms a first electrode of a flat capacitor. A layer having an electroluminescent pigmentation is applied to the electrically conductive base body or its electrically conductive coating. Various pigments, e.g., ZnS, ZnSe, ZnS/CdS, which luminesce under the effect of an electrical AC voltage field, are suitable for this purpose. The luminescence occurs only as long as the excitation by the AC voltage field is present. The electroluminescent layer may be applied by various methods, e.g., spray painting, brushing, special silk-screen printing methods, etc. To create the electrical field, it may be necessary to apply to the electroluminescent layer, a transparent, at least partially transparent, electrically conductive layer which forms the second electrode of the flat capacitor.

According to an example embodiment of the present invention, a transparent or partially transparent layer having a light-reflecting arrangement is provided on the layer forming the second electrode. In this context, the transparent or partially transparent, light-reflecting layer may be a transparent retro-reflecting film which is vapor-deposited toward the electroluminescent layer with an electrically conductive material for forming the second electrode.

According to an example embodiment, at least another transparent protective layer is applied on the light-reflecting, transparent layer.

To apply colored, e.g., black symbols, e.g., letter and/or number combinations, the reflective layer or the protective layer is such that it may be coated in color or may be able to be dyed, inked, etc.

Moreover, it is possible to apply the layer having the light-reflecting arrangement directly on the base body. This layer may be white. The layer having the light-reflecting arrangement may also be a film or foil, e.g., a self-adhesive film. According to an example embodiment, the light-reflecting layer at the same time also forms the insulation layer between the base body and the layer forming the first electrode. In this case, the license plate is constructed somewhat differently. Adjoining the layer having the light-reflecting arrangement is then the electrically conductive layer, forming the first electrode of the flat capacitor, upon which the electroluminescent coating is applied. Applied on the electroluminescent coating is then the electrically conductive layer forming the second electrode, which is covered by a protective layer.

In an example embodiment of the present invention, on the back side of the electrically conductive base body, an electrical insulation layer is applied which may also take the form of a self-adhesive film.

In an example embodiment of the plate, the electrically conductive base body or the electrically conductive layer of the base body and the layer formed as the second electrode in each case have a contact configuration for the electrical connection to an AC voltage source. If a holder or a holder frame is provided for fastening the license plate to a part of the motor vehicle, the holder or the holder frame may already have electrical contact elements for the electroconductive connection of the first and/or second electrode to the AC voltage source, the electrical connection already being achieved by the insertion of the license plate into the holder. According to an example embodiment of the holder or the holder frame, the AC voltage source, together with associated electrical equipment/electronics (transformer/converter), is integrated in the holder frame.

According to an example embodiment of the present invention, the electrically conductive layer of the base body and/or the conductive layer forming the second electrode is an electrically conductive film, e.g., a self-adhesive film.

According to an example embodiment of the present invention, the base body alone and/or the base body together at least with the electroluminescent layer and the electrically conductive layer for forming the second electrode is deformable, e.g., is able to be embossed to highlight symbols.

The electroluminescent pigmentation may include metal-doped zinc sulfite.

An aspect of the an example embodiment of the present invention is that, instead of an electroluminescent film, as is described in various publications, on a metallic or metallic-coated base body, an electroluminescent coating is applied which is not damaged by an embossing process as is used when manufacturing license plates for producing the vehicle-individual symbols, and which is able to be embossed. Another aspect of an example embodiment of the present invention is that the layer may also be applied on a plate that is already geometrically embossed.

Example embodiments of the present invention are described below with reference to the appended Figures.

DETAILED DESCRIPTION

Figure 1:
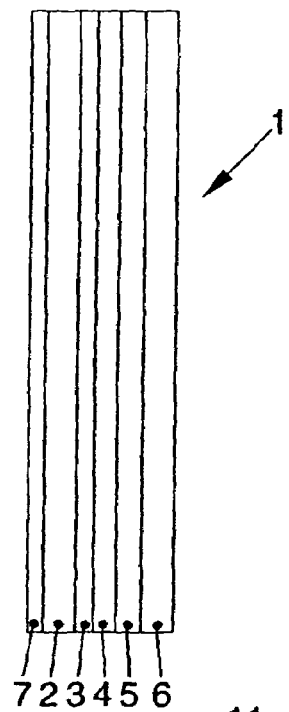
FIG. 1 illustrates a license-plate construction according to an example embodiment of the present invention prior to embossing the symbols.

License plate 1 of an example embodiment of the present invention according to FIG. 1 has a base body 2 made of aluminum, whose thickness is selected so that regions 8 raised with the aid of an embossing process are able to be produced on the base body, and which forms the first electrode of a flat capacitor. An electroluminescent layer 3, e.g., made of metal-doped zinc sulfite, is applied, for example, by a silk-screen printing process to base body 2. Transparent second electrode 4 is formed by an electrically conductive layer 4, which is applied on electroluminescent layer 3. This layer 4 may be a coating on electroluminescent layer 3, or may also be formed as a thin, electrically conductive film. On the second electrode is a transparent, reflecting, e.g., retro-reflecting layer 5 which may be formed as a coating, as a film, etc. In an exemplary embodiment, situated over reflecting layer 5 is a protective layer 6 that protects the license plate from mechanical and weather influences. This layer 6 may also take the form of a coating, a film, etc., e.g., a self-adhesive film. To insulate first electrode 2, an insulation and protective layer 7, which may be identical to layer 6, is additionally applied on the back side of first electrode 2.

Figure 2:
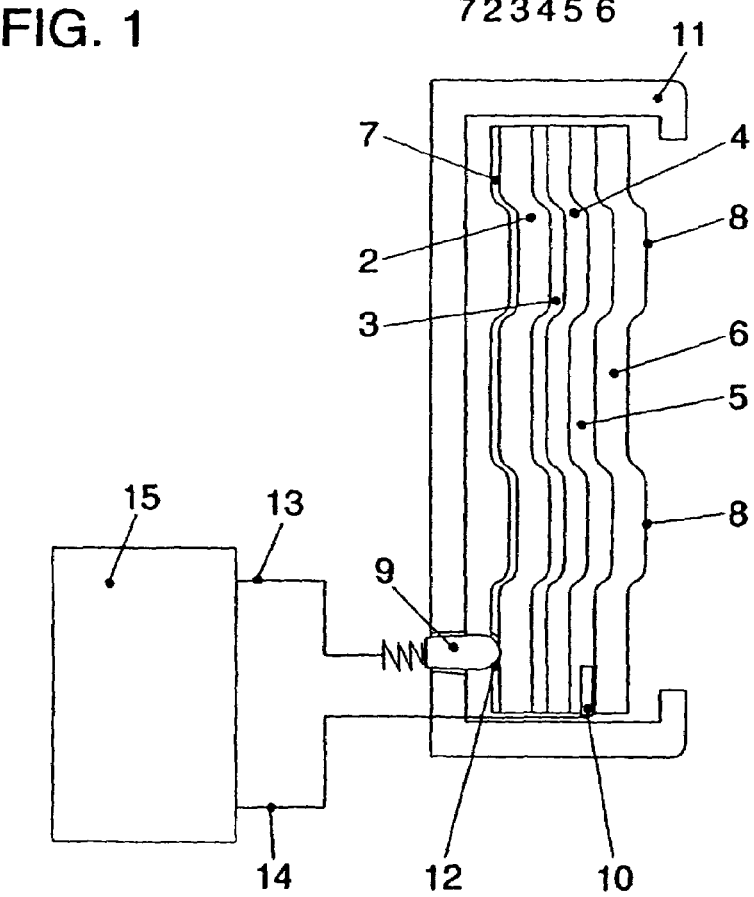
FIG. 2 illustrates a construction of the license plate in a holder frame after an embossing process.

FIG. 2 shows a license plate 1 that is already embossed and has a layer construction identical to FIG. 1. Raised regions 8, which form the vehicle-individual symbols, e.g., letter and/or number combinations, were produced by the mechanical embossing process. After the embossing process, the license plate is subjected to a color-rolling process so that the raised regions are colored and become easily visible. The license plate is slipped or inserted into a holder frame 11 on the vehicle. The electrical contacting of the two electrodes 2, 4 may be implemented via exposed regions 12 of the electrodes and contact elements 9, e.g., flexibly supported on holder frame 11, as are shown using first electrode 2 as an example, or via contact elements 10 integrated into the layer construction on the edge. Other example embodiments are possible. The two electrodes 2, 4 are connected to AC voltage source 15 via electric lines 13, 14.

What is claimed is:

1. A license plate for a motor vehicle, comprising:
   a base body one of (a) made of an electrically conductive material and (b) including an electrically conductive coating applied one of (i) directly and (ii) indirectly by a further layer, one of (a) the electrically conductive material and (b) the electrically conductive coating arranged as a first electrode;
   a coating including electroluminescent pigmentation and applied to one of (a) the base body and (b) the electrically conductive coating;
   an electrically conductive, transparent layer covering the coating and arranged as a second electrode; and
   an electrical insulation layer arranged on a back side of the base body,
   wherein the further layer includes a reflective, self-adhesive film.

2. The license plate according to claim 1, further comprising an additional layer arranged on the electrically conductive, transparent layer, the additional layer including a light-reflective arrangement.

3. The license plate according to claim 1, further comprising an additional layer arranged on the electrically conductive, transparent layer, the additional layer including light-reflective means.

4. The license plate according to claim 1, further comprising a light-reflective layer arranged on the electrically conductive, transparent layer.

5. The license plate according to claim 4, further comprising a transparent protective layer arranged on the light-reflective layer.

6. The license plate according to claim 1, wherein the further layer is electrically insulative.

7. The license plate according to claim 1, further comprising a transparent protective layer arranged on the electrically conductive, transparent layer.

8. The license plate according to claim 4, wherein the light-reflective layer is retro-reflective.

9. The license plate according to claim 4, wherein the light-reflective layer is configured to be one of (a) coated in color, (b) dyed and (c) inked.

10. The license plate according to claim 5, wherein one of (i) the transparent protective layer and (ii) the light-reflective layer is configured to be one of (a) coated in color, (b) dyed and (c) inked.

11. The license plate according to claim 1, further comprising a contact configuration adapted to electrically connect the electrically conductive, transparent layer and one of (a) the base body and (b) the electrically conductive layer of the base body to an AC voltage source.

12. The license plate according to claim 1, further comprising one of (a) a holder and (b) a holder frame configured to attach the plate to a motor vehicle part, the one of (a) the holder and (b) the holder frame including contact elements at least configured to connect one of (i) the base body and (ii) the electrically conductive layer of the base body to an AC voltage source.

13. The license plate according to claim 12, wherein the one of (a) the holder and (b) the holder frame includes contact elements configured to electrically connect the electrically conductive, transparent layer to the AC voltage source.

14. The license plate according to claim 1, wherein at least one of (a) the electrically conductive layer of the base body and (b) the electrically conductive, transparent layer includes an electrically conductive film.

15. The license plate according to claim 1, wherein at least one of (a) the electrically conductive layer of the base body and (b) the electrically conductive, transparent layer includes an electrically conductive, self-adhesive film.

16. The license plate according to claim 1, wherein at least one of (a) the base body and (b) the base body, the coating and the electrically conductive, transparent layer is deformable.

17. The license plate according to claim 1, wherein at least one of (a) the base body and (b) the base body, the coating and the electrically conductive, transparent layer is embossable.

18. The license plate according to claim 1, wherein the electroluminescent pigmentation includes metal-doped zinc sulfite.

* * * * *